United States Patent [19]

Muchow

[11] 4,180,238
[45] Dec. 25, 1979

[54] VALVE ACTUATOR HAVING A ROTARY BI-DIRECTIONAL APPARATUS WITH A DUAL RATCHET MECHANISM

[75] Inventor: John D. Muchow, Long Beach, Calif.

[73] Assignee: Valve Concepts International, Inc., Torrance, Calif.

[21] Appl. No.: 935,767

[22] Filed: Aug. 22, 1978

[51] Int. Cl.² .............................. F16K 31/52; F16K 31/16
[52] U.S. Cl. ............................ 251/58; 251/230; 74/128; 74/578
[58] Field of Search .................... 251/58, 230; 74/578, 74/128

[56] References Cited

U.S. PATENT DOCUMENTS

| 2,641,280 | 6/1953 | Fleischhauer | 251/230 X |
| 2,736,204 | 2/1956 | Hill | 74/578 |
| 2,880,757 | 4/1959 | Campbell | 251/58 X |
| 3,332,438 | 7/1967 | Abdullaev et al. | 251/230 X |

FOREIGN PATENT DOCUMENTS 46-36780 10/1967 Japan ........................................ 251/58

Primary Examiner—Arnold Rosenthal
Attorney, Agent, or Firm—W. Edward Johansen

[57] ABSTRACT

The present invention is a bi-directional valve actuator with a ratchet mechanism for use in combination with a control valve which includes a stem which, when turned, adjusts the flow through the control valve. The bi-directional valve actuator includes a frame which is mechanically coupled to the control valve adjacent to the other end of the stem of the control valve. The valve actuator also includes a shaft which is disposed within the frame and which is rotatably coupled thereto with the shaft being mechanically coupled to the stem of the control valve so it can turn the stem thereof, a first ratchet wheel and a second ratchet wheel. Each ratchet wheel is coaxially aligned with the shaft and is fixedly coupled thereto. The valve actuator further includes a pair of pawls, each of which is coupled to one of the ratchet wheels so that when the pawl is driven forward it becomes coupled to the teeth of one of the ratchet wheels and when the pawl is pulled backward it becomes uncoupled from the teeth of one of the ratchet wheels. Each pawl is mechanically coupled to and driven forward by a hydraulic cylinder with a piston, which is fixedly coupled to the pawl and it is also mechanically coupled to and driven backward by a pair of springs mechanically coupled to the frame. The pawl is coupled to the wheel of the ratchet wheel by a collar which is disposed about the peripheral edge of the ratchet wheel and which has a slot and a radially disposed hole with a pin and spring assembly therein. The pin and spring assembly is mechanically coupled to the pawl by a pin.

5 Claims, 5 Drawing Figures

VALVE ACTUATOR HAVING A ROTARY BI-DIRECTIONAL APPARATUS WITH A DUAL RATCHET MECHANISM

BACKGROUND OF THE INVENTION

1. Field of the Invention

The present invention relates to valve actuator and more particularly to a bi-directional rotary apparatus with two hydraulically driven advance levers incrementally driven by a hydraulic system.

2. Description of the Prior Art

U.S. Pat. No. 3,748,915, entitled Multiposition Bi-directional Rotary Means for a Switch or the Like, issued to Ronald C. Winter and Enno A. Knief on July 31, 1973, teaches a multiposition bi-directional rotary means for a switch which includes a rotary ratchet operated by two actuating push levers. Two advance levers or pawls are slidably and pivotally mounted and engage this ratchet from opposite radial directions. Each advance lever has means for engaging the ratchet to rotate the ratchet one step to an adjacent position and means to engage the ratchet and releasably hold it in a position. One lever rotates it in one direction the other lever rotates it the opposite direction. A single spring engages both advance levers to urge them radially inward toward the ratchet. Other springs urge the advance levers or pawls tangentially of the ratchet toward projected at-rest positions. The push levers have projections to engage the advance levers for effecting lineal sliding movement and permitting pivoting of such advance levers relative to the ratchet and the push levers.

U.S. Pat. No. 3,626,452 shows and describes multi-positioned bi-directionary rotary means for a switch or the like which utilizes independent slidably and pivotally mounted spring biased actuating levers or pawls. This patent however does not teach or disclose the use of a single C-shaped spring which urges such actuating levers or pawls radially inwardly toward the rotary ratchet. Neither does this patent utilize a ratchet engaging shape on the actuating levers or pawls which engages two teeth spaced by a third tooth on the ratchet to provide the locking means by one pawl during the retracting action of the other pawl from its ratchet advance position.

U.S. Pat. No. 3,768,775 entitled Portable Valve Actuator, issued to Monte B. Archer on Oct. 30, 1973, teaches a portable valve actuator.

U.S. Pat. No. 3,203,266, entitled Valve Mechanisms, issued to Robert S. Willis and William J. Baker on Aug. 31, 1965, teaches a valve operator for a valve mechanism having a movable valve member, wherein the operator comprises means connected to and moving the valve member by repeated movements of predetermined amount. In case the valve is of the rotary type in which the movement of the valve itself is reversed in moving from closed to opened position and back to closed position, the valve driving member of the valve operator is moved in either one of two directions. The repeated movements being preferably equal and each of a predetermined amount, the algebraic sum of the number of such movements may be used as an indicator of the valve position, making possible the location of the indicator at a position remote from the valve installation.

It is a serious problem in certain types of valves including those of the rotary type, particularly when they are remotely controlled or power operated, to set them at a desired position between the fully opened and closed positions. In each of the latter positions, it is possible to have stop means limiting the valve movement so that the valve stops at a known position in which it is fully opened or closed. However, such stop or limiting means cannot be applied directly to a valve at intermediate or partially open positions because such means would then interfere with movement of the valve beyond the stop means. There are many situations, as for example when a valve is used to meter fluid flow, in which it is necessary that the valve be accurately positioned at some position intermediate its full range of travel, while remaining free to continue movement.

Knowledge of the position of the valve should be readily available at all times and, consequently, it is desirable that the position of the valve should be indicated visually. When the valve is remotely controlled, it is especially desirable that such position indication be present at the remote control station either in addition to or instead of the indicating means located at the valve.

The valve operator of U.S. Pat. No. 3,203,266 may only be used with a multiple orifice-type valve which is fully closed by a turning of its stem of ninety degrees. The use of control valves of the needle and seat type require not only more torque to adjust their flow, but also more revolutions of the stem.

SUMMARY OF THE INVENTION

In view of the foregoing factors and conditions characteristic of the prior art, it is the primary object of the present invention to provide a power operator for a valve in which the valve will be actuated in step-by-step accurately repeated movements of known amount, whereby the the number of movements determines the valve position and controls remote indicating means in accordance with these movements to indicate the valve position.

It is another object of the present invention to provide a valve mechanism which is accurately positioned not only at terminal opened and closed positions, but also at selected positions intermediate the fully opened and closed positions.

It is still another object of the present invention to provide a power operator for a valve, which is controlled from a remote station having means for indicating the position of the valve accurately at all times.

It is yet another object of the present invention to provide a power operator for a control valve that includes a needle and seat valve mechanism.

It is yet still another object of the present invention to provide a rotary apparatus that not only has a bi-directional ratchet, but can also provide a torque substantial enough to turn the stem of a control valve.

In accordance with an embodiment of the present invention a bi-directional valve actuator with a ratchet mechanism for use in combination with a control valve which includes a stem which, when turned, adjusts the flow through the control valve is described. The bi-directional valve actuator includes a frame which is mechanically coupled to the control valve adjacent to the outer end of the stem of the control valve. The valve actuator also includes a shaft which is disposed within the frame and which is rotatably coupled thereto with the shaft being mechanically coupled to the stem of the control valve so it can turn the stem thereof, a first ratchet wheel and a second ratchet wheel. Each ratchet wheel is coaxially aligned with the shaft and is fixedly coupled thereto. The valve actuator further includes a pair of pawls, each of which is coupled to one of the ratchet wheels so that when the pawl is driven forward it becomes coupled to the teeth of one of the ratchet wheels and when the pawl is pulled backward it becomes uncoupled from the teeth of one of the ratchet wheels. Each pawl is mechanically coupled to and driven forward by a hydraulic cylinder with a piston, which is fixedly coupled to the pawl and it is also mechanically coupled to and driven backward by a pair of springs mechanically coupled to the frame. The pawl is coupled to the teeth of the ratchet wheel by a collar which is disposed about the peripheral edge of the ratchet wheel and which has a slot and a radially disposed hole with a pin and spring assembly therein. The pin and spring assembly is mechanically coupled to the pawl by a pin.

The features of the present invention which are believed to be novel are set forth with particularity in the appended claims.

Other objects and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

In order to best understand the present invention it is necessary to first understand the operation of control valves which are adjusted by the rotation of a stem.

U.S. Pat. No. 2,684,688 entitled Automatic Valve and System, issued to Homer G. Thornhill of July 27, 1954, teaches a valve that includes a valve body having a threaded inlet adapted to be connected to a side arm of a Christmas tree manifold. The valve body also has a flanged outlet adapted to be connected to a positive choke from which leads the pipe line going to the storage tank. The valve body is in the shape of a T, the inlet being at the base of the T, and the outlet being in one of the arms of the T. Through the other arm of the T projects a valve stem on which is mounted the valve which cooperates with a removable valve seat threadedly supported within the outlet. The valve stem is slidably supported within the center of the arm of the T opposite the outlet by means of a flanged valve bonnet.

The valve bonnet is sealed to the end of the valve body by means of a ring gasket and is secured thereto by means of a fast coupling.

Other patents include U.S. Pat. No. 3,166,092, U.S. Pat. No. 2,227,297, U.S. Pat. No. 2,684,689, U.S. Pat. No. 3,049,140 and U.S. Pat. No. 3,166,093. All of these patents teach valves which have valve members which are conically shaped and which are adapted to be inserted into a valve seat or sealing member. These types of valves are generally referred to as needle and seat choke valves.

Figure 1:
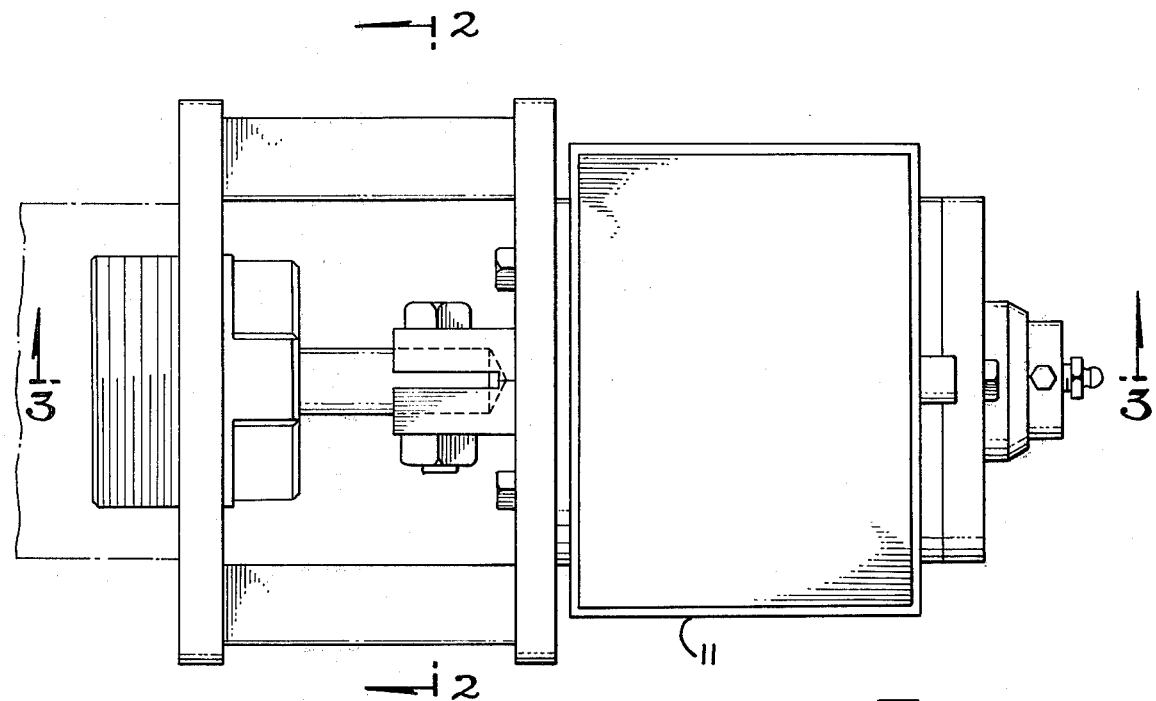
FIG. 1 is a top plan view of a bi-directional valve actuator for use in combination with a control valve which has been constructed in accordance with the principles of the present invention.
Figure 2:
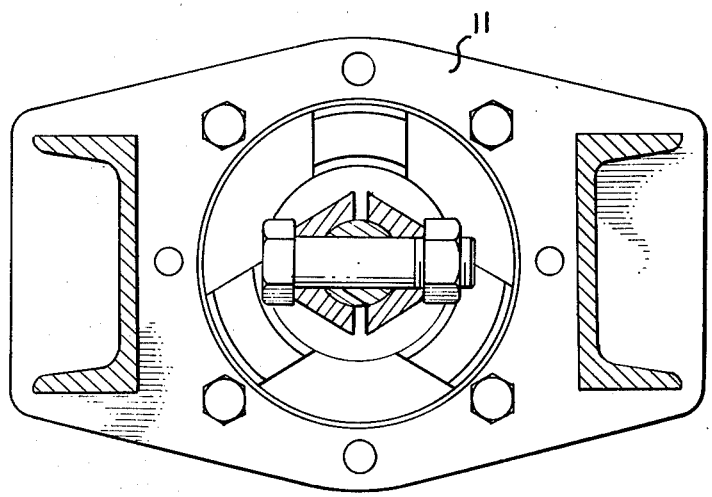
FIG. 2 is a vertical transverse cross-sectional view of the bi-directional valve actuator of FIG. 1 taken along the line 2—2 of FIG. 1.

The present invention is a bi-directional valve actuator with a ratchet mechanism for use in combination with a control valve which includes a stem which, when turned, adjusts the flow through the control valve. Referring to FIG. 1 and FIG. 2 the bi-directional valve actuator includes a frame 11 which is mechanically coupled to the control valve adjacent to the outer end of the stem thereof.

Figure 3:
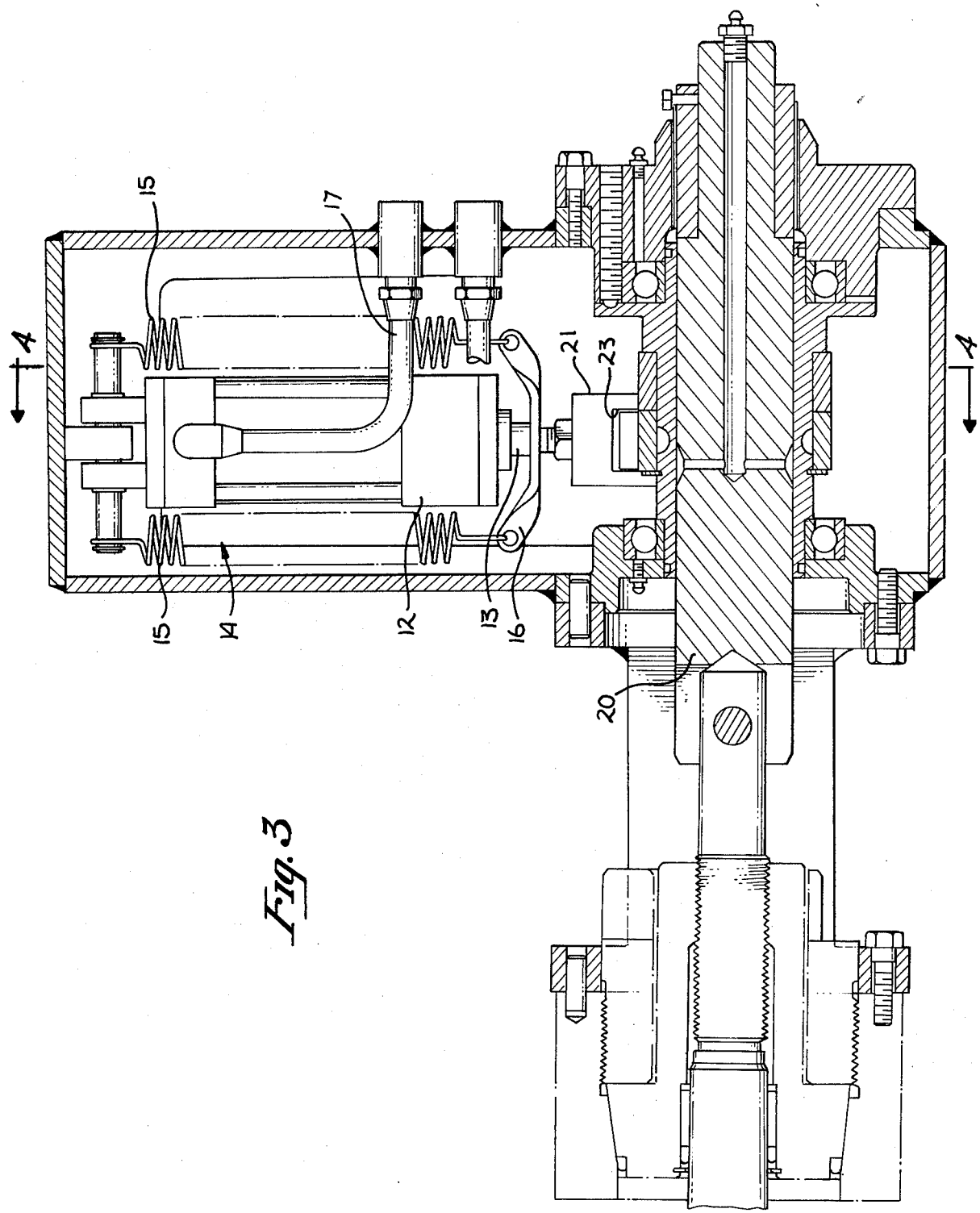
FIG. 3 is a vertical cross-sectional view of the bi-directional valve actuator of FIG. 1 taken along the line 3—3 of FIG. 1 showing the bi-directional valve actuator in a first position.

Referring to FIG. 3 in conjunction with FIG. 1 the bi-directional valve actuator also includes a pair of hydraulic cylinders 12 which are mechanically coupled to the frame 11 and each of which has a piston 13 and a resiliently biasing apparatus 14 for resiliently biasing the piston 13. The resiliently biasing apparatus 14 includes a pair of springs 15 which are disposed parallelly to each hydraulic cylinder 12 and an elongated member 16 with two arms which is mechanically coupled to the piston 13 of each hydraulic cylinder 12 and which is disposed orthogonally to the piston 12 and coaxially aligned therewith. Each of the springs 15 is mechanically coupled to one of the pair of arms of the elongated member 16.

Still referring to FIG. 3 the bi-directional valve actuator further includes a controlling device for controlling the pairs of cylinders 12 which in the preferred embodiment are controlled by fluid from a pair of pipes 17 which are fluidly coupled to the hydraulic cylinders 12. The fluid is delivered by a pumping apparatus which is controlled locally or remotely.

Figure 4:
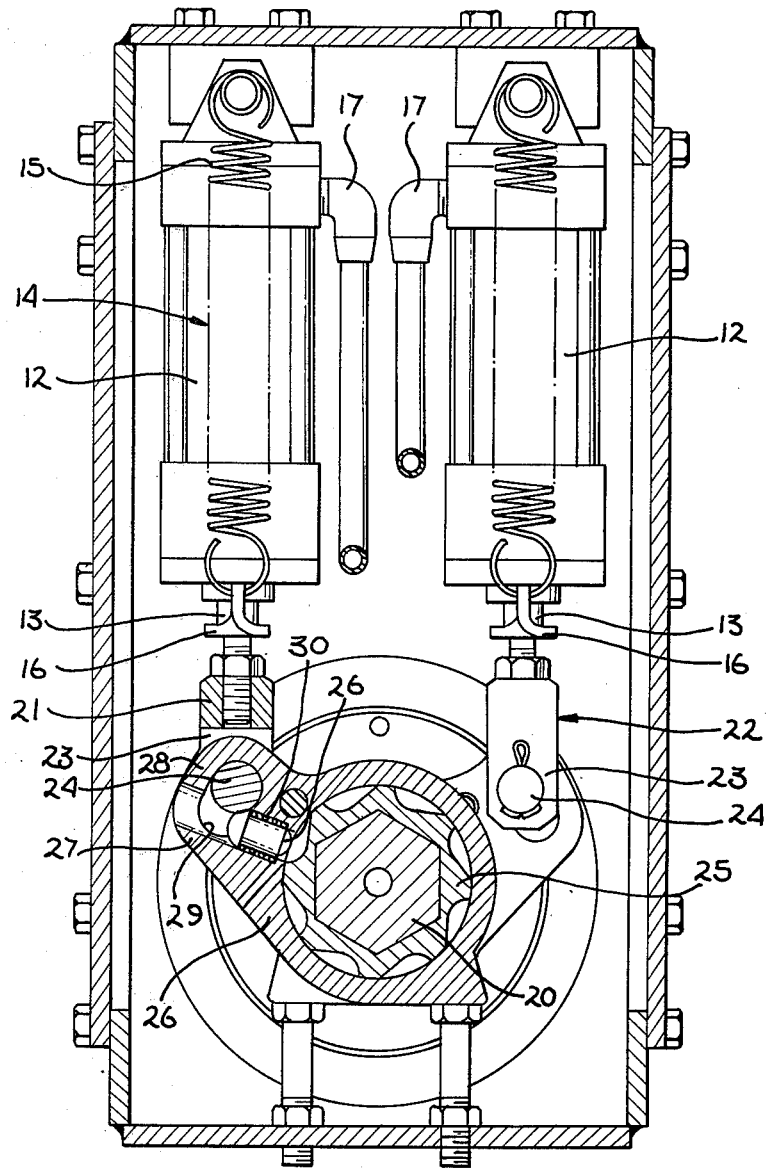
FIG. 4 is a vertical transverse cross-sectional view of the bi-directional valve actuator of FIG. 1 taken along the line 4—4 of FIG. 3.

Referring to FIG. 3 in conjunction with FIG. 4 the bi-directional valve actuator further includes a shaft 20 which is disposed within the frame 11 and which is rotatably coupled thereto, a first ratchet mechanism 21 and a second ratchet mechanisms 22, both of which are fixedly coupled to the shaft 20 and coaxially aligned therewith. The shaft 20 is mechanically coupled to the stem of the control valve so that it can turn the stem thereof and in the preferred embodiment is an elongated hexagonal member. Each of the ratchet mechanism 21 and 22 includes a pawl 23 having a first end and a second end with the second end of each pawl 23 being mechanically coupled to one of the pistons 13 in order that one of the hydraulic cylinders 12 may drive it forward and a pin 24 which is fixedly coupled to the first end of the pawl 23. Each of the ratchet mechanism 21 and 22 also includes a ratchet wheel 25 which is coaxially aligned with the shaft 17 and which is fixedly coupled thereto. The ratchet wheels 25 of both the first and second ratchet mechanisms 21 and 22 are identical parts which are disposed contiguously to each other on the shaft 20, but are disposed oppositely to each other. Each of the ratchet mechanisms 21 and 22 further includes a collar 26, which is slidably engaged about the peripheral edge of one of the ratchet wheels 25 and which has a hole 27 that is disposed along a radial axis of the ratchet wheel 25 and tangent thereto and also has a flanged portion 28 that is disposed about the hole 27 and that has a slot 29 which is orthogonally disposed to the hole 27 and adjacent thereto with the slot 29 being adapted so that the pin 24 can travel therein, and a pin and spring assembly 30 which is disposed in the hole 27 of the collar 26 and which is in physical communication with the disc 24 in the slot 29 of the collar 26 so that the pin and spring assembly 30 is adapted to engage and disengage the teeth of the ratchet wheel 25.

The ratchet mechanisms 21 and 22 provides a device which couples the pawl 23 through the pin 24 and the pin and spring assembly to the teeth of the ratchet wheel 25 during a forward stroke of the piston 13 of the hydraulic cylinder 12 and which uncouples it therefrom during the backward stroke of the piston 13 of the hydraulic cylinder 12. The piston 13 is driven alternately forward by an increment of force from the pumping apparatus and backward by the resiliently biasing apparatus 14.

Figure 5:
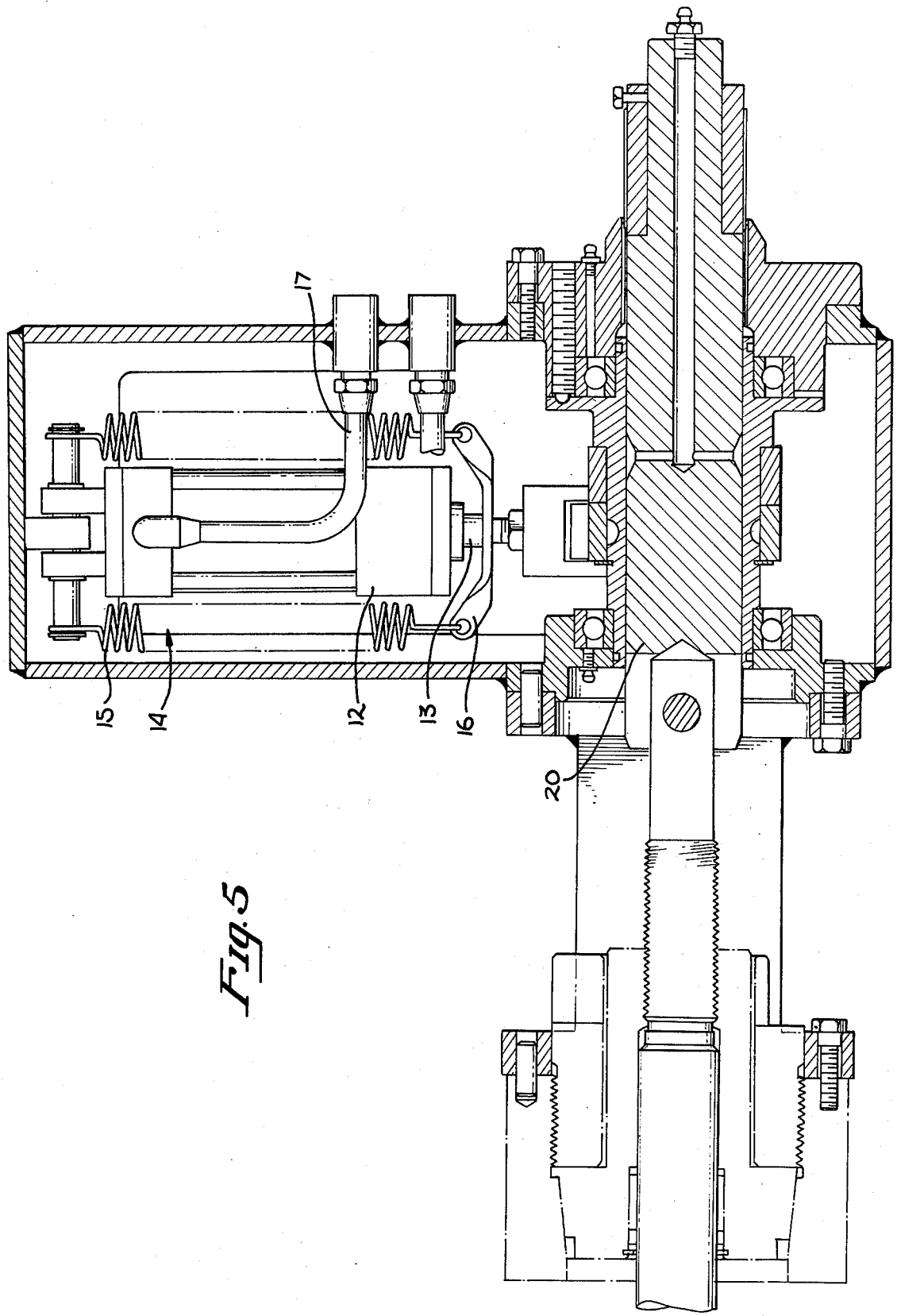
FIG. 5 is a vertical transverse cross-sectional view of the bi-directional valve actuator of FIG. 1 taken along the line 3—3 of FIG. 1 showing the bi-directional valve actuator in a second position.

Referring to FIG. 5 in conjunction with FIG. 4 the shaft 20 has moved to a second position in order to adjust the flow through the control valve.

Referring to FIG. 3 the two collars 26 and the two ratchet wheels 25 are shown mechanically coupled to each other by a pin and spring assembly disposed in each collar 26 which are disposed along a radial line thereof and opposite to each other forty-five degrees (45°) above the horizontal and a dimple in each collar which is disposed opposite to the dimple in the other collar 26 along the horizontal with the dimple being adapted to receive the head of the pin and spring assembly of the other collar 26. Each collar 26 has a flatted portion which is oppostely disposed from the flanged portion thereof and which is adapted to engage an adjustable bolt which is coupled to the frame 11 in order to limit the rotational movement of the collar 26. These two devices which couple the two collars 26 together and which limit their rotational movement are necessary in order to avoid the possibility of the bi-directional valve actuator binding up and becoming inoperable.

From the foregoing it can be seen that a bi-directional valve actuator with a ratchet mechanism for use in combination with a control valve has been described. The advantage of the bi-directional valve actuator is that it may be used for control valves which require a plurality of turns of their stems in order to adjust their flow.

Accordingly it is intended that the foregoing disclosure and showing made in the drawing shall be considered only as an illustration of the present invention. Furthermore, it should be noted that the sketches are not drawn to scale and that distances of and between the various figures are not to be considered significant. The invention will be set forth with particularity in the appended claims.

What is claimed is:

1. A bi-directional valve actuator with a ratchet mechanism for use in combination with a control valve which includes a stem which, when turned, adjusts the flow through the control valve, said bi-directional valve actuator comprising:
   a. a frame which is mechanically coupled to the control valve adjacent to the outer end of the stem thereof;
   b. a shaft disposed within said frame and rotatably coupled thereto, said shaft is mechanically coupled to the stem of the control valve so that it can turn the stem thereof;
   c. a first ratchet wheel which is coaxially aligned with said shaft and which is fixedly coupled thereto;
   d. a second ratchet wheel which is coaxially aligned with said shaft and which is fixedly coupled thereto;
   e. a first pawl having a first end and a second end;
   f. coupling means for coupling said first end of said first pawl to said first ratchet wheel during a forward stroke of said first pawl and for uncoupling said first end of said first pawl from said first ratchet wheel during a backward stroke of said first pawl;
   g. a first hydraulic cylinder which is mechanically coupled to said frame and which has a piston which is mechanically coupled to said second end of said first pawl in order to drive it forward;
   h. a first elongated member with two arms which is mechanically coupled to said piston of said first hydraulic cylinder adjacent to said first pawl and which is disposed orthogonally to said piston and aligned coaxially therewith;
   i. a first pair of springs which are disposed parallelly to said first hydraulic cylinder and each of which is mechanically coupled to said frame and to one of said two arms of said first elongated member whereby said piston of said first hydraulic cylinder and said first pair of springs interact to provide a reciprocal and incremental force on said first pawl in order to drive said first pawl;
   j. a second pawl having a first end and a second end;
   k. coupling means for coupling said first end of said second pawl to said second ratchet wheel during a forward stroke of said second pawl and for uncoupling said first end of said second pawl from said second ratchet wheel during a backward stroke of said second pawl;
   l. a second hydraulic cylinder which is mechanically coupled to said frame and which has a piston which is mechanically coupled to said second end of said second pawl in order to drive it forward;
   m. a second elongated member with two arms which is mechanically coupled to said piston of said second hydraulic cylinder adjacent to said second pawl and which is disposed orthogonally to said piston and aligned coaxially therewith; and
   n. a second pair of springs which are disposed parallelly to said second hydraulic cylinder and each of which is mechanically coupled to said frame and to one of said two arms of said second elongated member whereby said piston of said second hydraulic cylinder and said second pair of springs interact to provide a reciprocal and incremental force on said second pawl in order to drive said second pawl.

2. A bi-directional valve actuator with a ratchet mechanism for use in combination with a control valve which includes a stem which, when turned, adjusts the flow through the control valve, said bi-directional valve actuator comprising:
   a. a frame which is mechanically coupled to the control valve adjacent to the outer end of the stem thereof;
   b. a shaft disposed within said frame and rotatably coupled thereto, said shaft is mechanically coupled to the stem of the control valve so that it can turn the stem thereof;
   c. a first ratchet wheel which is coaxially aligned with said shaft and which is fixedly coupled thereto;

d. a second ratchet wheel which is coaxially aligned with said shaft and which is fixedly coupled thereto;
e. a first pawl having a first end and a second end;
f. a first hydraulic cylinder which is mechanically coupled to said frame and which has a piston which is mechanically coupled to said second end of said first pawl in order to drive it forward;
g. a first elongated member with two arms which is mechanically coupled to said piston of said first hydraulic cylinder adjacent to said first pawl and which is disposed orthogonally to said piston and aligned coaxially therewith;
h. a first pair of springs which are disposed parallelly to said first hydraulic cylinder and each of which is mechanically coupled to said frame and to one of said two arms of said first elongated member whereby said piston of said first hydraulic cylinder and said first pair of springs interact to provide a reciprocal and incremental force on said first pawl in order to drive said first pawl;
i. a second pawl having a first end and a second end;
j. a second hydraulic cylinder which is mechanically coupled to said frame and which has a piston which is mechanically coupled to said second end of said second pawl in order to drive it forward;
k. a first elongated member with two arms which is mechanically coupled to said piston of said second hydraulic cylinder adjacent to said second pawl and which is disposed orthogonally to said piston and aligned coaxially therewith;
l. a second pair of springs which are parallelly to said second hydraulic cylinder and each of which is mechanically coupled to said frame and to one of said two arms of said second elongaged member whereby said piston of said second hydraulic cylinder and said second pair of springs interact to provide a reciprocal and incremental force on said second pawl in order to drive said second pawl; and
m. first and second coupling means for coupling said first end of said first and second pawls, respectively, to said first and second ratchet wheels during a forward stroke of of said first and second pawls and for uncoupling said first end of said first and second pawls from said first and second ratchet wheel during a backward stroke of said first and second pawl, wherein each of said first and second coupling means comprises:
a. a collar which is slideably engaged about the peripheral edge of one of said ratchet wheels, said collar having a hole disposed along a radial axis of said one of said ratchet wheels and tangent thereto and also having a flanged portion disposed about said hole with said flanged portion also having a slot which is disposed orthogonally to saod hole and which is adjacent thereto;
b. a pin which is fixedly coupled to said first end of said pawl and which is adapted to travel in said slot of said collar; and
c. a pin and spring assembly which is disposed in said hole of said collar and which is in physical communication with said pin in said slot of said collar, said pin and spring assembly is adapted to engage and and disengage the teeth of said one of said ratchet wheels.

3. A bi-directional valve actuator according to claim 2 wherein said collar has a flatted portion which is disposed oppositely from said flanged portion thereof and wherein said coupling means also comprises a bolt which is adjustably coupled to said frame and which is adapted to restrict the rotational movement of said collar.

4. A bi-directional valve actuator according to claim 3 wherein said reciprocating means includes a pair of said collars which are disposed adjacent to each other and which are adapted to rotate in opposite directions in response to said driving means.

5. A bi-directional valve actuator according to claim 4 wherein each of said pair of said collars has a limiting means for limiting its motion relative to the other of said pair of said collars.

* * * * *